(12) United States Patent
Little (10) Patent No.: US 7,061,995 B2
(45) Date of Patent: Jun. 13, 2006

(54) APPARATUS AND METHOD TO GENERATE AN ADAPTIVE SLICER THRESHOLD FOR BINARY DATA

(75) Inventor: James M. Little, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 10/003,340

(22) Filed: Oct. 31, 2001

(65) Prior Publication Data

US 2003/0081697 A1    May 1, 2003

(51) Int. Cl.
*H04L 25/06* (2006.01)
*H03K 5/153* (2006.01)

(52) U.S. Cl. .......................... 375/317; 375/318; 327/58
(58) Field of Classification Search ................. 375/317, 375/318, 319, 355
See application file for complete search history.

(56) References Cited

U.S. PATENT DOCUMENTS

| | | | | |
|---|---|---|---|---|
| 4,692,765 A | * | 9/1987 | Politis et al. ............... | 342/106 |
| 4,700,365 A | * | 10/1987 | Casey ......................... | 375/317 |
| 4,736,163 A | * | 4/1988 | Berkhout et al. ............ | 327/58 |
| 4,823,360 A | * | 4/1989 | Tremblay et al. ........... | 375/214 |
| 4,873,700 A | * | 10/1989 | Wong ......................... | 375/317 |
| 5,371,545 A | * | 12/1994 | Tults .......................... | 348/465 |
| 5,412,692 A | * | 5/1995 | Uchida ....................... | 375/317 |
| 5,483,289 A | * | 1/1996 | Urade et al. ................ | 348/468 |
| 5,670,951 A | * | 9/1997 | Servilio et al. ............. | 375/287 |
| 5,832,039 A | * | 11/1998 | Rijns .......................... | 375/317 |
| 6,026,773 A | * | 2/2000 | LaBelle ..................... | 123/179.3 |
| 6,041,084 A | * | 3/2000 | Nagaraj ...................... | 375/317 |
| 6,178,210 B1 | * | 1/2001 | Craig et al. ................. | 375/346 |
| 6,263,018 B1 | * | 7/2001 | Lee ............................. | 375/233 |
| 6,492,929 B1 | * | 12/2002 | Coffey et al. ............... | 341/155 |
| 6,556,635 B1 | * | 4/2003 | Dehghan ..................... | 375/345 |
| 6,735,260 B1 | * | 5/2004 | Eliezer et al. .............. | 375/316 |
| 2002/0001354 A1 | * | 1/2002 | McNally ..................... | 375/317 |
| 2002/0122504 A1 | * | 9/2002 | Payne et al. ................ | 375/317 |

FOREIGN PATENT DOCUMENTS

EP        001148682 A2 *  10/2001

* cited by examiner

*Primary Examiner*—Emmanuel Bayard
*Assistant Examiner*—Lawrence Williams
(74) *Attorney, Agent, or Firm*—Pillsbury Winthrop Shaw Pittman LLP (57) ABSTRACT

An adaptive slicer threshold generation system includes a first moving average filter to determine a first average value of a first binary signal. A second moving average filter is included to determine a second average value of a second binary signal. A combiner combines the first average value of the first binary signal and the second average value of the second binary signal to generate a combined output.

17 Claims, 7 Drawing Sheets

APPARATUS AND METHOD TO GENERATE AN ADAPTIVE SLICER THRESHOLD FOR BINARY DATA

BACKGROUND OF THE INVENTION

1. Field of the Invention

The present invention generally relates to a signal processing circuit for slicing binary signals in a receiver. More particularly, the present invention relates to a signal processing circuit that generates an adaptive slicer threshold by using either average amplitude data of both binary ones and binary zeros, or minimum amplitude data of a binary one and maximum amplitude data of a binary zero.

2. Discussion of the Related Art

Data communication using binary signals takes place at high rates in various applications. For example, in optical data systems, data transmission rates of 10 gigabits/second (Gb/s) and higher are utilized. In such binary data communication systems, a receiver is used for receiving the binary signals from a transmitter. In many cases, the signals received are of a low level and are accompanied by noise and/or jitter (see FIG. 2). The true binary nature of a distinct rectangular pulse, usually designating a binary one, sometimes can be partly obscured by noise, and result in data errors that adversely affect signal processing equipment to which the output of the receiver is applied.

To improve the ability to accurately recapture the binary signals passing through the receiver before being supplied to other equipment, a slicing technique is employed. This technique involves slicing the received binary signal at a level about the midpoint of its amplitude, that is, between its maximum and minimum values. The portion of the received binary signal appearing above the slicing level corresponds to a binary one and the portion below the slicing level corresponds to a binary zero (see FIG. 1 and FIG. 2).

In one type of prior art slicer circuit, the slicer threshold is fixed at a certain voltage level. A variable offset voltage is combined with the voltage level of the received binary signal to maintain the midpoint of the binary signal that is applied to the slicer at the fixed slicer threshold. However, adjusting the received binary signal to maintain the midpoint of the binary signal at a fixed level adds complexity to a system.

In another type of prior art slicer circuit, the slicer threshold is varied so as to be at the midpoint of the amplitude of the binary signal, wherein the midpoint is calculated to be the average of the maximum and minimum values of the received binary signal. However, the midpoint that is calculated using the maximum and minimum values of the received binary signal is the midpoint between the outer edges of the data eye 100, 200 (see FIG. 1 and FIG. 2). The data eye 100, 200 is a plot of sampled data values for a given time period. This method is incapable of accurately determining the midpoint between either the average values of the data eye 100, 200 edges or the inner edges of the data eye 100, 200.

Figure 1:
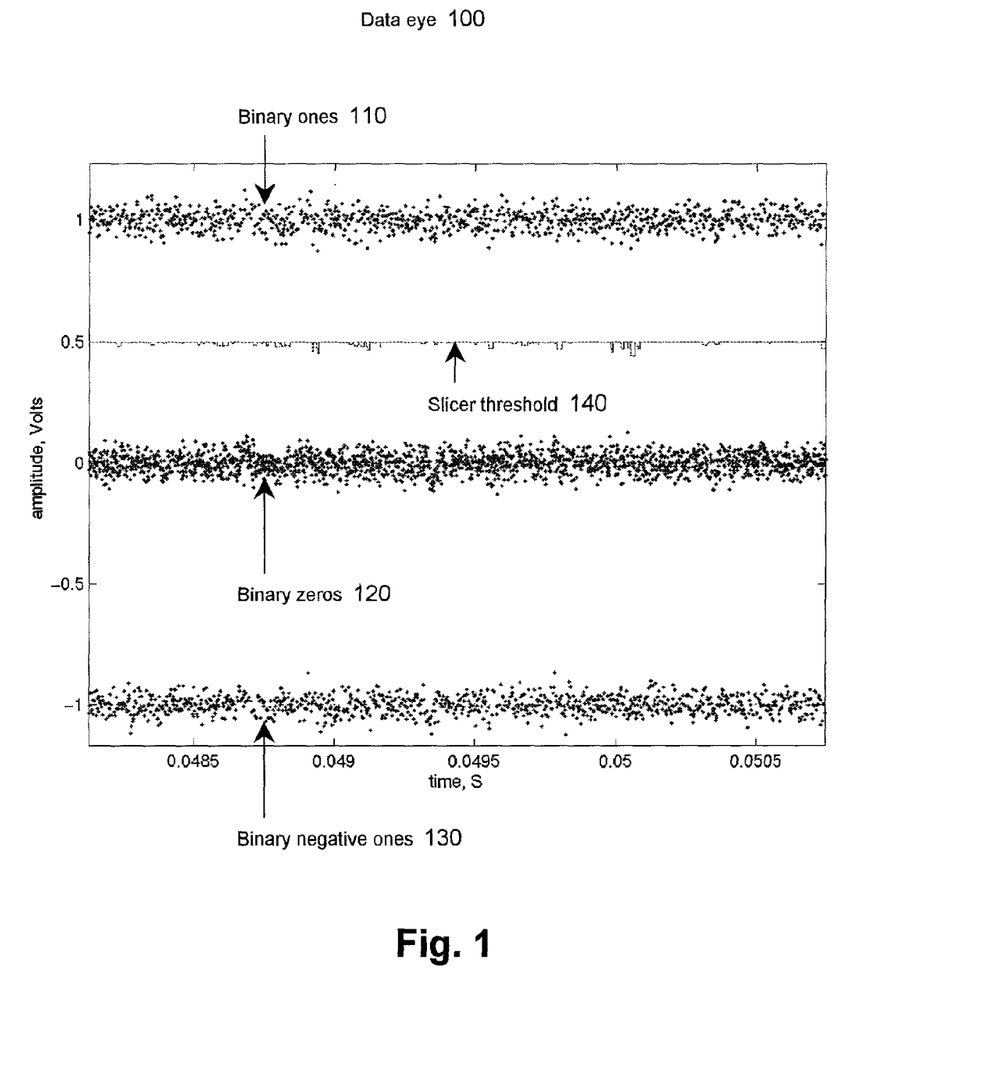
FIG. 1 illustrates a data eye according to an embodiment of the present invention.
Figure 2:
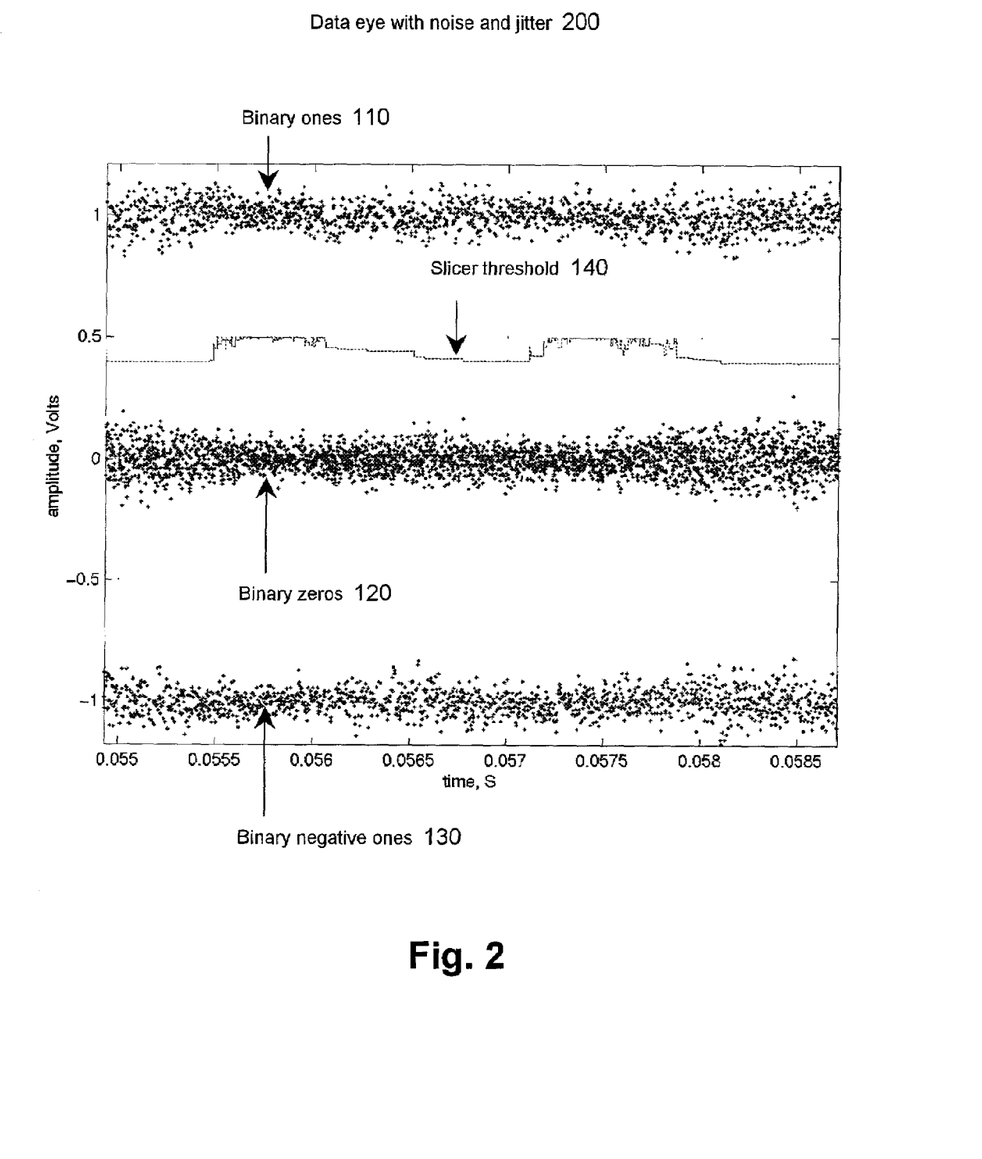
FIG. 2 illustrates a data eye with noise and jitter according to an embodiment of the present invention.

Thus, a slicer circuit that is capable of accurately determining the midpoint between the average values of the data eye 100, 200 or the inner edges of the data eye 100, 200 is required.

DETAILED DESCRIPTION

FIG. 1 illustrates a data eye according to an embodiment of the present invention. The data eye 100 is a plot of sampled data values for a given time period. The slicer threshold 140 is a voltage level above which a received binary signal is read as a binary one and below which a received binary signal is read as a binary zero. Sampled data values within the data eye 100 that fall above the slicer threshold 140 are read as binary ones 110, and sampled data values within the data eye 100 that fall below the slicer threshold 140 are read as binary zeros 120. A first absolute value element 450 (see FIG. 4 and FIG. 5) and a second absolute value element 460 may be included within an adaptive slicer threshold generation system 400, 500 to treat a binary negative one as a binary one.

For example, if a received binary signal encounters a positive DC offset, the data eye 100 will reflect a data sample that is offset in the positive voltage direction (i.e., the data sample will be shifted upward within FIG. 1) in relation to samples that did not encounter the positive DC offset. Consequently, the slicer threshold 140 may be shifted upward within FIG. 1, depending partly upon the method by which the slicer threshold 140 is set. Thus, an increase in voltage level of the received binary signal may result in a positive voltage shift of the slicer threshold 140. Similarly, a decrease in voltage level of the received binary signal may result in a negative voltage shift of the slicer threshold 140.

The slicer threshold 140 is, therefore, adaptively generated to track the data eye 100. A received binary signal is compared to the slicer threshold 140 to determine whether the received binary signal will be read as a binary one or as a binary zero.

FIG. 2 illustrates a data eye with noise and jitter according to an embodiment of the present invention. If noise and/or jitter affect the amplitude of a received binary signal, the voltage level of the data eye 200 may be shifted. Noise and/or jitter may affect the amplitude of a slicer threshold 140 because the slicer threshold 140 tracks the data eye 200.

Figure 3:
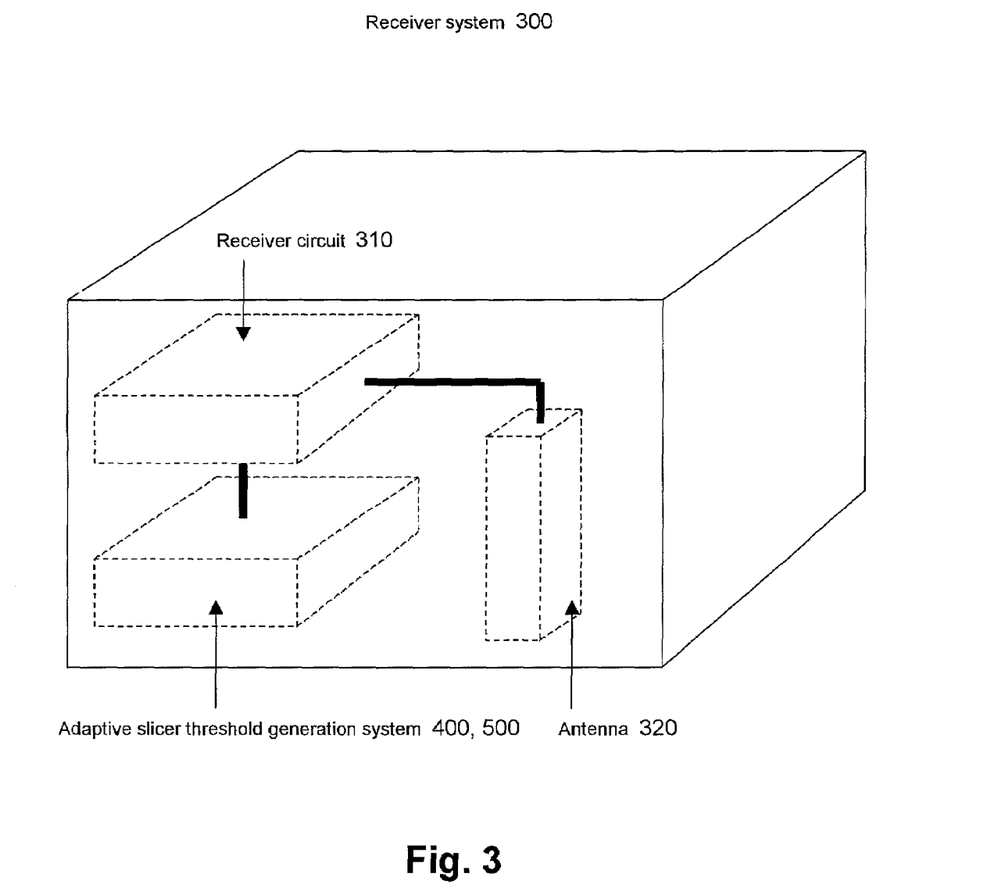
FIG. 3 illustrates a receiver system according to an embodiment of the present invention.

FIG. 3 illustrates a receiver system according to an embodiment of the present invention. The receiver system 300 includes a receiver circuit 310, an antenna 320, and an adaptive slicer threshold generation system 400, 500 (see FIG. 4 and FIG. 5). The antenna 320 detects a signal. The receiver circuit 310 receives the signal and processes the signal. The adaptive slicer threshold generation system 400, 500 receives the signal and generates a slicer threshold 140 (see FIG. 1 and FIG. 2).

The adaptive slicer threshold generation system 400 includes a first moving average filter 410 (see FIG. 4), a second moving average filter 420, a combiner 430, and preferably a gain element 440. The first moving average filter 410 receives a first binary signal to determine a first average value. The second moving average filter 420 receives a second binary signal to determine a second average value. The combiner 430 combines the first average value and the second average value. The gain element 440 preferably sets a value of a slicer threshold 140 (see FIG. 1 and FIG. 2) within a data eye 100, 200.

Figure 4:
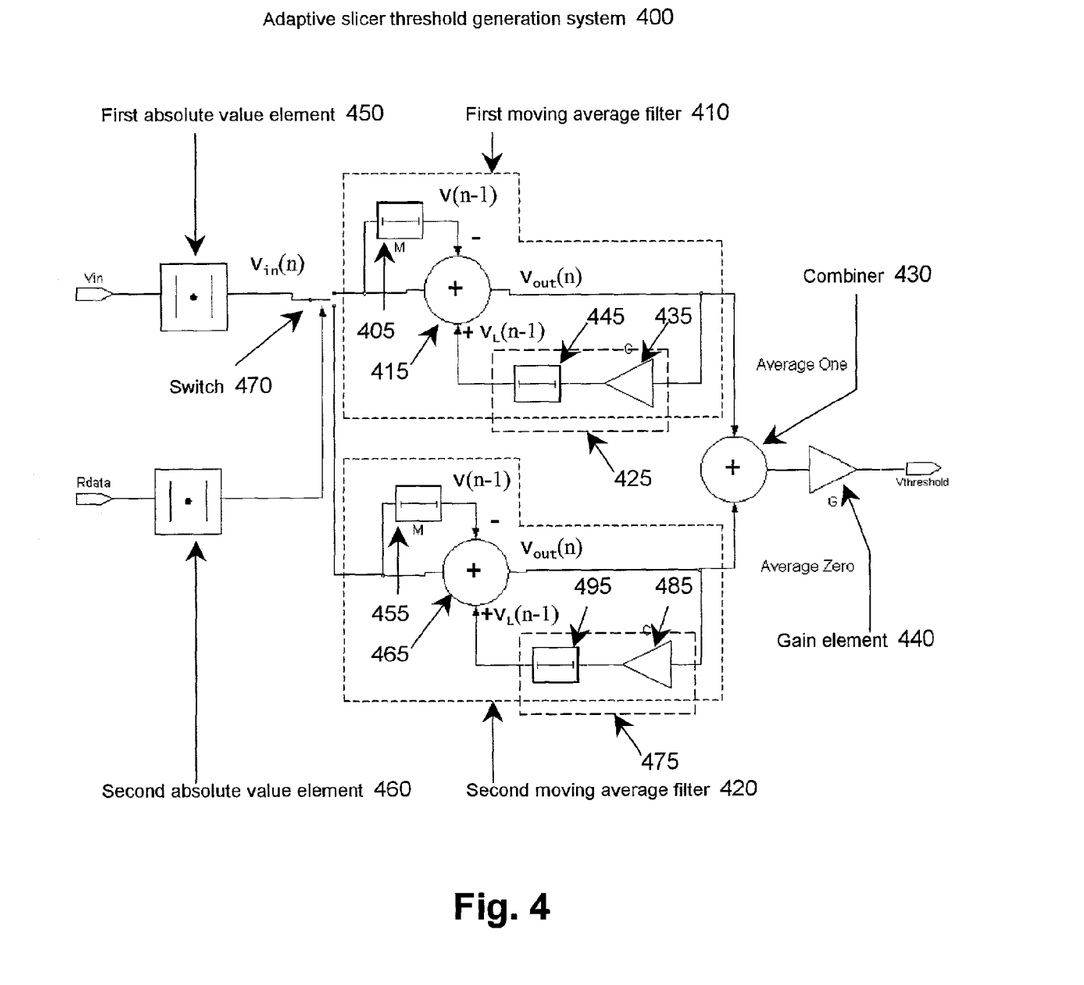
FIG. 4 illustrates an adaptive slicer threshold generation system according to an embodiment of the present invention.

According to an embodiment of the invention, the first moving average filter 410 and/or the second moving average filter 420 includes a leakage element 425, 475 to control an adaptation rate of the slicer threshold 140.

The adaptive slicer threshold generation system 500 includes a minimum detector 510 (see FIG. 5), a peak detector 520, a combiner 430, and preferably a gain element 440. The minimum detector 510 receives a binary signal to determine a minimum value of a binary one. The peak detector 520 receives a binary signal to determine a maximum value of a binary zero. The combiner 430 combines the minimum value of the binary one and the maximum value of the binary zero. The gain element 440 preferably sets a value of a slicer threshold 140 (see FIG. 1 and FIG. 2) within a data eye 100, 200.

Figure 5:
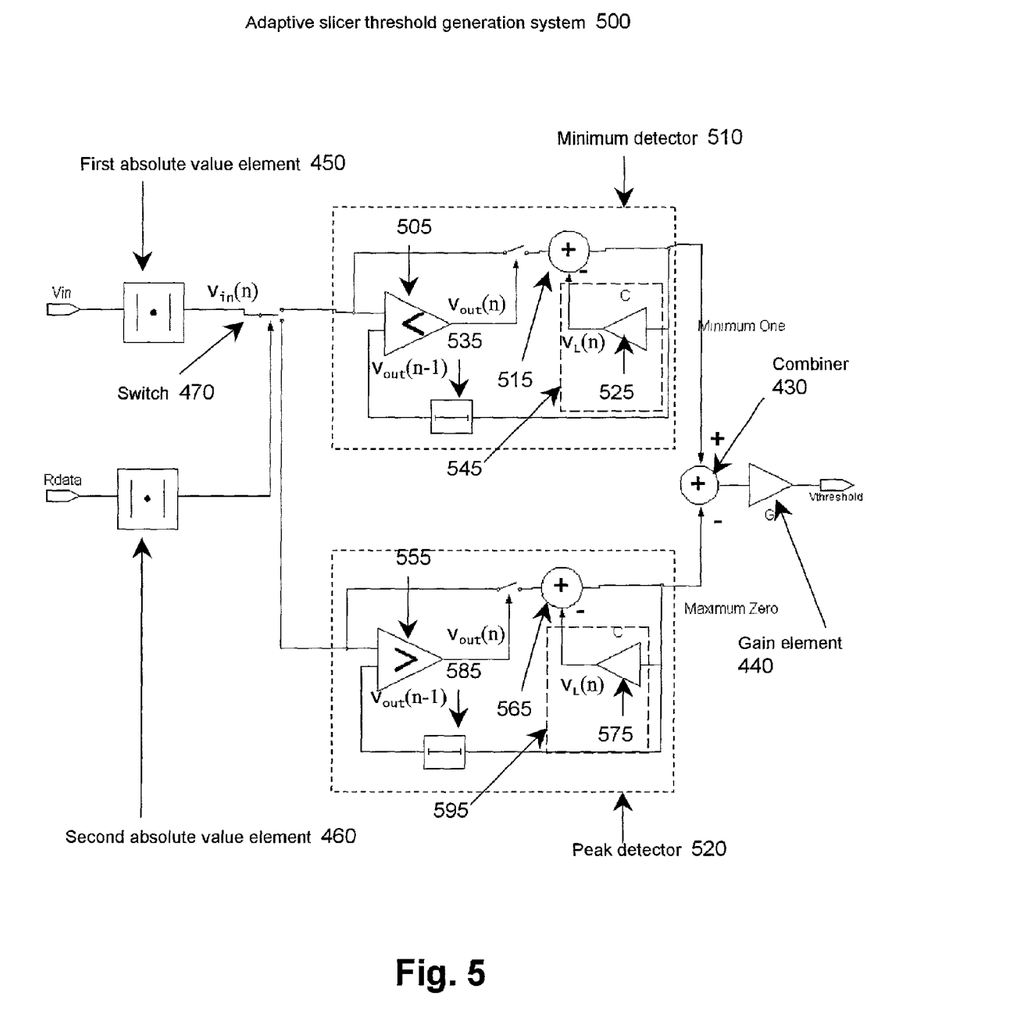
FIG. 5 illustrates an adaptive slicer threshold generation system according to another embodiment of the present invention.

According to an embodiment of the invention, the minimum detector 510 and/or the peak detector 520 includes a leakage element 545, 595 to control an adaptation rate of the slicer threshold 140.

FIG. 4 illustrates an adaptive slicer threshold generation system according to an embodiment of the present invention. The adaptive slicer threshold generation system 400 includes a first moving average filter 410, a second moving average filter 420, a combiner 430, and preferably a gain element 440. The first moving average filter 410 receives a first binary signal to determine a first average value. The second moving average filter 420 receives a second binary signal to determine a second average value. The combiner 430 combines the first average value and the second average value to generate a combined output. The gain element 440 preferably sets a value of a slicer threshold 140 (see FIG. 1 and FIG. 2) within a data eye 100, 200.

The first moving average filter 410 averages binary ones 110 (see FIG. 1 and FIG. 2) that the adaptive slicer threshold generation system 400 receives. The first moving average filter 410 preferably includes a first delay element 405, a combiner 415, a gain element 435, and a second delay element 445. The first delay element 405 and the combiner 415 each receive the binary signal, $v_{in}(n)$. The combiner 415 combines a delayed binary signal, $v(n-1)$, which has passed through the first delay element 405, with the received binary signal, $v_{in}(n)$, and preferably a leakage signal, $v_L(n-1)$. The leakage signal, $v_L(n-1)$, is a sample of the output signal, $v_{out}(n)$, of the combiner 415 that has passed through both the gain element 435 and the second delay element 445. The output signal, $v_{out}(n)$, of the combiner 415 preferably is stored in a storage element. The storage element may be the combiner 415; however, any other suitable device may be used. If the gain of the gain element 435 is 1.0, for example, the output signal, $v_{out}(n)$, of the combiner 415 may become very sensitive to a single error and/or a large noise event. Thus, the gain of the gain element 435 is preferably slightly less than one.

The second moving average filter 420 averages binary zeros 120 (see FIG. 1 and FIG. 2) that the adaptive slicer threshold generation system 400 receives. The second moving average filter 420 preferably includes a first delay element 455, a combiner 465, a gain element 485, and a second delay element 495. The first delay element 455 and the combiner 465 each receive the binary signal, $v_{in}(n)$. The combiner 465 combines a delayed binary signal, $v(n-1)$, which has passed through the first delay element 455, with the received binary signal, $v_{in}(n)$, and preferably a leakage signal, $v_L(n-1)$. The leakage signal, $v_L(n-1)$, is a sample of the output signal, $v_{out}(n)$, of the combiner 465 that has passed through both the gain element 485 and the second delay element 495. The output signal, $v_{out}(n)$, of the combiner 465 preferably is stored in a storage element. The storage element may be the combiner 465; however, any other suitable device may be used. If the gain of the gain element 485 is 1.0, for example, the output signal, $v_{out}(n)$, of the combiner 465 may become very sensitive to a single error and/or a large noise event. Thus, the gain of the gain element 485 is preferably slightly less than one.

The adaptive slicer threshold generation system 400 selects a slicer threshold 140 (see FIG. 1 and FIG. 2) within a data eye 100, 200, above which an input signal will be read as a binary one, and below which the input signal will be read as a binary zero. The slicer threshold 140 may be selected at any voltage level between the average value of a binary one and the average value of a binary zero by varying the gain of the gain element 440. For example, if a received binary signal is read as a one and the received binary signal is greater in amplitude than the average value of a binary one, then the average value of a binary one may be increased proportionately. Similarly, for example, if a received binary signal is read as a one and the received binary signal is lower in amplitude than the average value of a binary one, then the average value of a binary one may be decreased proportionately. A change in either the average value of a binary one or the average value of a binary zero will change the range of voltages from which the slicer threshold 140 may be selected.

According to an embodiment of the present invention, the adaptive slicer threshold generation system 400 further includes a first absolute value element 450, a second absolute value element 460, and a switch 470. In a three level system (i.e., when a received binary signal may be either a binary one, a binary zero, or a binary negative one), the first absolute value element 450 and the second absolute value element 460 convert a binary negative one into a binary one. This technique assumes that a received binary signal is symmetric. The first absolute value element 450 receives a received binary signal. The second absolute value element 460 receives an $R_{data}$ signal. The $R_{data}$ signal is the received binary signal that has preferably passed through a comparator. The comparator outputs a digitized received binary signal to control the switch 470. The switch 470 receives the digitized received binary signal and connects the received binary signal that has passed through the first absolute value element 450 to either the first moving average filter 410 or the second moving average filter 420. If the digitized received binary signal is a binary one, then the switch 470 connects the received binary signal that has passed through the first absolute value element 450 to the first moving average filter 410. If the digitized received binary signal is a binary zero, then the switch 470 connects the received binary signal that has passed through the first absolute value element 450 to the second moving average filter 420.

FIG. 5 illustrates an adaptive slicer threshold generation system according to another embodiment of the present invention. The adaptive slicer threshold generation system 500 includes a minimum detector 510, a peak detector 520, a combiner 430, and preferably a gain element 440.

The minimum detector 510 receives a binary signal to determine a minimum value of a binary one. The minimum detector 510 illustratively includes a minimum comparator 505, a combiner 515, a gain element 525, and a delay element 535. The minimum comparator 505 compares a received binary signal, $v_{in}(n)$, and a delayed output signal, $v_{out}(n-1)$, of the minimum comparator 505. The delayed output signal, $v_{out}(n-1)$, of the minimum comparator 505 results when an output signal, $v_{out}(n)$, of the minimum comparator 505 is passed through both the combiner 515 and the delay element 535. The combiner 515 combines the output signal, $v_{out}(n)$, of the minimum comparator 505 with preferably a leakage signal, $v_L(n)$. The leakage signal, $v_L(n)$, is a sample of the output signal, $v_{out}(n)$, of the combiner 515 that has passed through the gain element 525.

If the received binary signal, $v_{in}(n)$, of the minimum comparator 505 of the minimum detector 510 is less than the delayed output signal, $v_{out}(n-1)$, of the minimum comparator 505 that has passed through both the combiner 515 and the delay element 535, then the minimum comparator 505 outputs the received binary signal, $v_{in}(n)$, of the minimum comparator 505. Thus, the output signal, $v_{out}(n)$, of the minimum comparator 505 substantially equals the received binary signal, $v_{in}(n)$, of the minimum comparator 505. In this case, the received binary signal, $v_{in}(n)$, of the minimum comparator 505 is preferably stored in a storage element that may be coupled to the output node of the minimum comparator 505. Storage of the received binary signal, $v_{in}(n)$, of the minimum comparator 505 occurs when the minimum comparator 505 outputs the output signal, $v_{out}(n)$, that substantially equals the received binary signal, $v_{in}(n)$, of the minimum comparator 505. The storage element may be the combiner 515; however, any other suitable device may be used. The gain of the gain element 525 is preferably substantially less than one, so that the leakage signal, $v_L(n)$, eventually approximates a value of zero. The delay element 535 delays the output signal, $v_{out}(n)$, of the combiner 515 that is compared with the received binary signal, $v_{in}(n)$, by the minimum comparator 505.

If the received binary signal, $v_{in}(n)$, of the minimum comparator 505 of the minimum detector 510 is not less than the delayed output signal, $v_{out}(n-1)$, of the minimum comparator 505 that has passed through both the combiner 515 and the delay element 535, then the minimum comparator 505 outputs the delayed output signal, $v_{out}(n-1)$, of the minimum comparator 505. Thus, the output signal, $v_{out}(n)$, of the minimum comparator 505 substantially equals the delayed output signal, $v_{out}(n-1)$, of the minimum comparator 505. In this case, the delayed output signal, $v_{out}(n-1)$, of the minimum comparator 505 is preferably stored in a storage element that may be coupled to the output node of the minimum comparator 505. Storage of the delayed output signal, $v_{out}(n-1)$, of the minimum comparator 505 occurs when the minimum comparator 505 outputs the output signal, $v_{out}(n)$, that substantially equals the delayed output signal, $v_{out}(n-1)$, of the minimum comparator 505. The storage element may be the combiner 515; however, any other suitable device may be used.

Thus, the minimum detector 510 tracks the lower boundary (i.e., inner edge) of the portion of the data eye 100, 200 (see FIG. 1 and FIG. 2) that represents a binary one.

The peak detector 520 receives a binary signal to determine a maximum value of a binary zero. The peak detector 520 illustratively includes a peak comparator 555, a combiner 565, a gain element 575, and a delay element 585. The peak comparator 555 compares a received binary signal, $v_{in}(n)$, and a delayed output signal, $v_{out}(n-1)$, of the peak comparator 555. The delayed output signal, $v_{out}(n-1)$, of the peak comparator 555 results when an output signal, $v_{out}(n)$, of the peak comparator 555 is passed through both the combiner 565 and the delay element 585. The combiner 565 combines the output signal, $v_{out}(n)$, of the peak comparator 555 with preferably a leakage signal, $v_L(n)$. The leakage signal, $v_L(n)$, is a sample of the output signal, $v_{out}(n)$, of the combiner 565 that has passed through the gain element 575.

If the received binary signal, $v_{in}(n)$, of the peak comparator 555 of the peak detector 520 is more than the delayed output signal, $v_{out}(n-1)$, of the peak comparator 555 that has passed through both the combiner 565 and the delay element 585, then the peak comparator 555 outputs the received binary signal, $v_{in}(n)$, of the peak comparator 555. Thus, the output signal, $v_{out}(n)$, of the peak comparator 555 substantially equals the received binary signal, $v_{in}(n)$, of the peak comparator 555. In this case, the received binary signal, $v_{in}(n)$, of the peak comparator 555 is preferably stored in a storage element that may be coupled to the output node of the peak comparator 555. Storage of the received binary signal, $v_{in}(n)$, of the peak comparator 555 occurs when the peak comparator 555 outputs the output signal, $v_{out}(n)$, that substantially equals the received binary signal, $v_{in}(n)$, of the peak comparator 555. The storage element may be the combiner 565; however, any other suitable device may be used. The gain of the gain element 575 is preferably substantially less than one, so that the leakage signal, $v_L(n)$, eventually approximates a value of zero. The delay element 585 delays the output signal, $v_{out}(n)$, of the combiner 565 that is compared with the received binary signal, $v_{in}(n)$, by the peak comparator 555.

If the received binary signal, $v_{in}(n)$, of the peak comparator 555 of the peak detector 520 is not more than the delayed output signal, $v_{out}(n-1)$, of the peak comparator 555 that has passed through both the combiner 565 and the delay element 585, then the peak comparator 555 outputs the delayed output signal, $v_{out}(n-1)$, of the peak comparator 555. Thus, the output signal, $v_{out}(n)$, of the peak comparator 555 substantially equals the delayed output signal, $v_{out}(n-1)$, of the peak comparator 555. In this case, the delayed output signal, $v_{out}(n-1)$, of the peak comparator 555 is preferably stored in a storage element that may be coupled to the output node of the peak comparator 555. Storage of the delayed output signal, $v_{out}(n-1)$, of the peak comparator 555 occurs when the peak comparator 555 outputs the output signal, $v_{out}(n)$, that substantially equals the delayed output signal, $v_{out}(n-1)$, of the peak comparator 555. The storage element may be the combiner 565; however, any other suitable device may be used.

Thus, the peak detector 520 tracks the upper boundary (i.e., inner edge) of the portion of the data eye 100, 200 (see FIG. 1 and FIG. 2) that represents a binary zero.

The combiner 430 combines the minimum value of the binary one and the maximum value of the binary zero to generate a combined output. The gain element 440 preferably sets a value of a slicer threshold 140 within a data eye 100, 200.

The adaptive slicer threshold generation system 500 selects a slicer threshold 140 (see FIG. 1 and FIG. 2) within a data eye 100, 200, above which an input signal will be read as a binary one, and below which the input signal will be read as a binary zero. The slicer threshold 140 may be selected at any voltage level between the minimum value of a binary one and the maximum value of a binary zero by varying the gain of the gain element 440. For example, if a received binary signal is read as a one and the received binary signal is lower in amplitude than the minimum value of a binary one, then the minimum value of a binary one may be decreased to substantially equal the received binary signal. Similarly, for example, if a received binary signal is read as a zero and the received binary signal is greater in amplitude than the maximum value of a binary zero, then the maximum value of a binary zero may be increased to substantially equal the received binary signal. A change in either the minimum value of a binary one or the maximum value of a binary zero will change the range of voltages from which the slicer threshold 140 may be selected.

According to an embodiment of the present invention, the adaptive slicer threshold generation system 500 further includes a first absolute value element 450, a second absolute value element 460, and a switch 470. The switch 470 receives the digitized received binary signal and connects the received binary signal that has passed through the first absolute value element 450 to either the minimum detector 510 or the peak detector 520. If the digitized received binary signal is a binary one, then the switch 470 connects the received binary signal that has passed through the first absolute value element 450 to the minimum detector 510. If the digitized received binary signal is a binary zero, then the switch 470 connects the received binary signal that has passed through the first absolute value element 450 to the peak detector 520.

Figure 6:
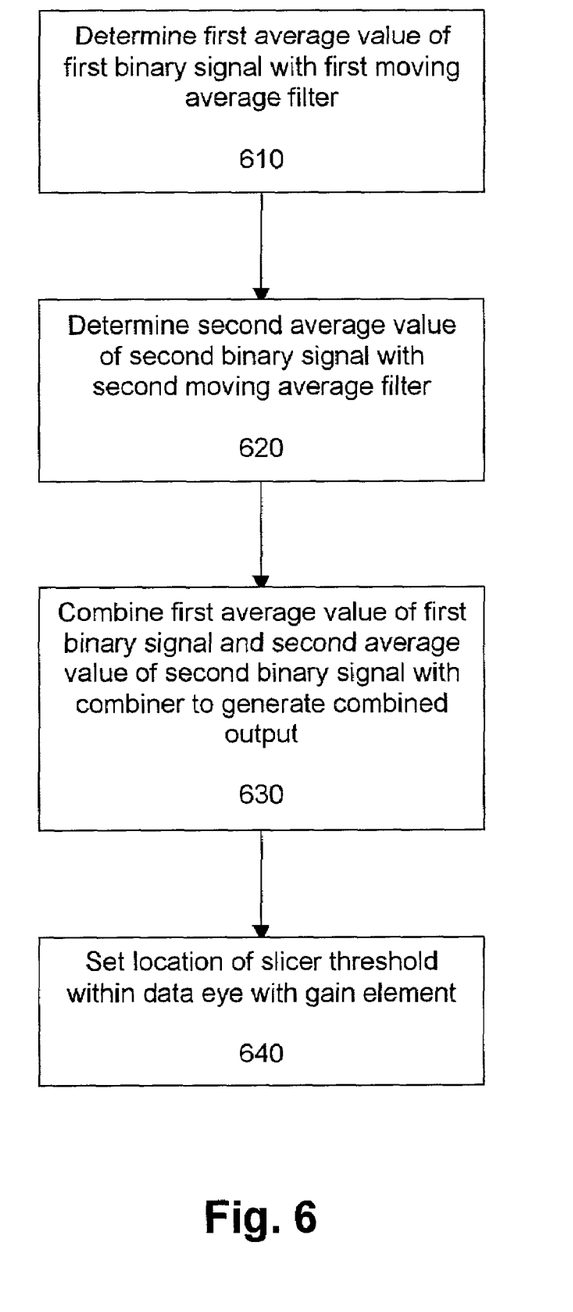
FIG. 6 illustrates a flow chart for a method of generating an adaptive slicer threshold according to an embodiment of the present invention.

FIG. 6 illustrates a flow chart for a method of generating an adaptive slicer threshold according to an embodiment of the present invention. Within the method and referring to FIG. 4, a first average value of a first binary signal is determined 610 with a first moving average filter 410. A second average value of a second binary signal is determined 620 with a second moving average filter 420. The first average value and the second average value are combined 630 with a combiner 430 to generate a combined output. The value of a slicer threshold 140 (see FIG. 1 and FIG. 2) within a data eye 100, 200 is set 640 with a gain element 440. The slicer threshold 140 may be set at any point between the average values of the data eye 100, 200 edges. For example, adding the first average value and the second average value and selecting the gain of the gain element 440 to be 0.5 sets the slicer threshold 140 at the midpoint between the average values of the data eye 100, 200 edges.

Figure 7:
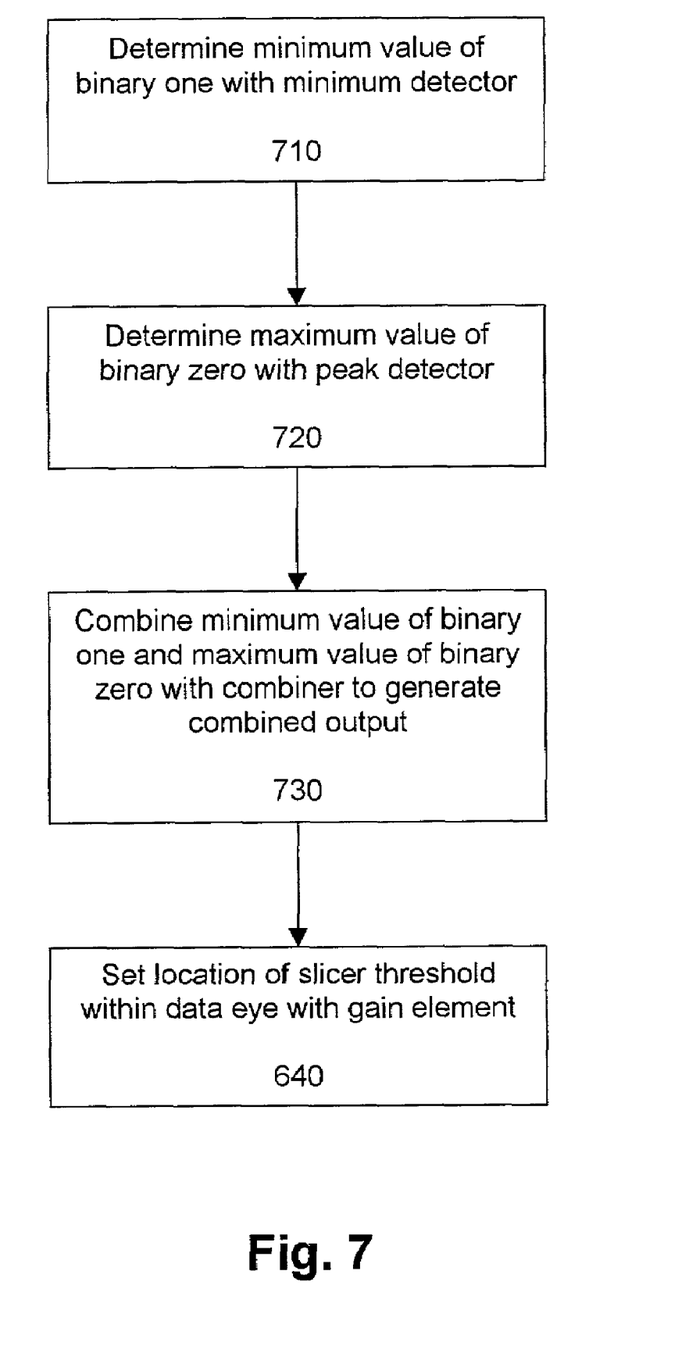
FIG. 7 illustrates a flow chart for a method of generating an adaptive slicer threshold according to another embodiment of the present invention.

FIG. 7 illustrates a flow chart for a method of generating an adaptive slicer threshold according to another embodiment of the present invention. Within the method and referring to FIG. 5, a minimum value of a binary one is determined 710 with a minimum detector 510. A maximum value of a binary zero is determined 720 with a peak detector 520. The minimum value of the binary one and the maximum value of the binary zero are combined 730 with a combiner 430 to generate a combined output. The value of a slicer threshold 140 (see FIG. 1 and FIG. 2) within a data eye 100, 200 is set 640 with a gain element 440. The slicer threshold 140 may be set at any point between the inner edges of the data eye 100, 200. For example, adding the minimum value of a binary one and the maximum value of a binary zero and selecting the gain of the gain element 440 to be 0.5 sets the slicer threshold 140 at the midpoint between the inner edges of the data eye 100, 200.

In summary, the adaptive slicer threshold generation system 400 (see FIG. 4) according to the present invention determines the midpoint between the average values of the data eye 100, 200 edges (see FIG. 1 and FIG. 2) by using average amplitude data of both binary ones 110 and binary zeros 120. Furthermore, the adaptive slicer threshold generation system 500 (see FIG. 5) according to the present invention determines the midpoint between the inner edges of the data eye 100, 200 (see FIG. 1 and FIG. 2) by using minimum amplitude data of a binary one and maximum amplitude data of a binary zero.

The adaptive slicer threshold generation system 400, 500 improves noise immunity for a receiver system, such as an Intel LXT3108 T1 receiver. Furthermore, the adaptive slicer threshold generation system 400, 500 of the present invention uses amplitude data of both binary ones 110 and binary zeros 120 to calculate the midpoint of a data eye 100, 200, providing a more accurate representation of the data eye 100, 200 than systems that use only a received peak value.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. An adaptive slicer threshold generation system, comprising:
    a first moving average filter to determine a first average value of a first binary signal;
    a second moving average filter to determine a second average value of a second binary signal, wherein at least one of the first moving average filter and the second moving average filter includes
    a first delay element to delay a received binary signal;
    a first combiner to combine the received binary signal, a delayed binary signal from the first delay element, and a delayed output signal from a second delay element; and
    a gain element to manipulate an output signal from the first combiner, wherein the second delay element delays the output signal that is combined by the first combiner with the received binary signal and the delayed binary signal; and
    a second combiner to combine the first average value of the first binary signal and the second average value of the second binary signal to generate a combined output.

2. An adaptive slicer threshold generation system, comprising:
    a minimum detector to determine a minimum value of a binary one, wherein the minimum detector includes
    a minimum comparator to compare a received binary signal with a delayed output signal from a first combiner; and
    a delay element to delay an output signal from the first combiner that is compared with the received binary signal by the minimum comparator, wherein
    the first combiner combines the output signal from the minimum comparator with a leakage signal from a gain element, and
    the gain element manipulates the output signal from the first combiner;
    a peak detector to determine a maximum value of a binary zero; and
    a second combiner to combine the minimum value of the binary one and the maximum value of the binary zero to generate a combined output.

3. An adaptive slicer threshold generation system, comprising:
a minimum detector to determine a minimum value of a binary one;
a peak detector to determine a maximum value of a binary zero, wherein the peak detector includes a peak comparator to compare a received binary signal with a delayed output signal from a first combiner, and a delay element to delay an output signal from the first combiner that is compared with the received binary signal by the minimum comparator, the first combiner combining an output signal from the peak comparator with a leakage signal from a gain element, and the gain element manipulating the output signal from the first combiner; and
a second combiner to combine the minimum value of the binary one and the maximum value of the binary zero to generate a combined output.

4. A receiver system, comprising:
a receiver circuit;
an antenna coupled to the receiver circuit; and
an adaptive slicer threshold generation system coupled to the receiver circuit, having
a first moving average filter to determine a first average value of a first binary signal,
a second moving average filter to determine a second average value of a second binary signal, wherein at least one of the first moving average filter and the second moving average filter includes a first delay element to delay a received binary signal, a first combiner to combine the received binary signal, a delayed binary signal from the first delay element, and a delayed output signal from a second delay element, and a gain element to manipulate an output signal from the first combiner, the second delay element delaying the output signal that is combined by the first combiner with the received binary signal and the delayed binary signal, and
a second combiner to combine the first average value of the first binary signal and the second average value of the second binary signal to generate a combined output.

5. A receiver system, comprising:
a receiver circuit;
an antenna coupled to the receiver circuit; and
an adaptive slicer threshold generation system coupled to the receiver circuit, having
a minimum detector to determine a minimum value of a binary one, the minimum detector including a minimum comparator to compare a received binary signal with a delayed output signal from a first combiner, and a delay element to delay an output signal from the first combiner that is compared with the received binary signal by the minimum comparator, the first combiner, combining the output signal from the minimum comparator with a leakage signal from a gain element, and the gain element manipulating the output signal from the first combiner,
a peak detector to determine a maximum value of a binary zero, and
a second combiner to combine the minimum value of the binary one and the maximum value of the binary zero to generate a combined output.

6. A receiver system, comprising:
a receiver circuit;
an antenna coupled to the receiver circuit; and
an adaptive slicer threshold generation system coupled to the receiver circuit, having
a minimum detector to determine a minimum value of a binary one,
a peak detector to determine a maximum value of a binary zero, wherein the peak detector includes
a peak comparator to compare a received binary signal with a delayed output signal from a first combiner; and
a delay element to delay an output signal from the first combiner that is compared with the received binary signal by the peak comparator, wherein the first combiner combines an output signal from the peak comparator with a leakage signal from a gain element, and the gain element manipulates the output signal from the first combiner, and
a second combiner to combine the minimum value of the binary one and the maximum value of the binary zero to generate a combined output.

7. A method of generating an adaptive slicer threshold, comprising:
determining a first average value by combining a first received binary signal and a first delayed binary signal, wherein the first average value is further determined by combining a first leakage signal with the first received binary signal and the first delayed binary signal;
determining a second average value by combining a second received binary signal and a second delayed binary signal;
combining the first average value and the second average value to generate a combined output; and
setting a value of a slicer threshold within a data eye.

8. A method of generating an adaptive slicer threshold, comprising:
determining a first average value by combining a first received binary signal and a first delayed binary signal;
determining a second average value by combining a second received binary signal and a second delayed binary signal, wherein the second average value is further determined by combining a second leakage signal with the second received binary signal and the second delayed binary signal;
combining the first average value and the second average value to generate a combined output; and
setting a value of a slicer threshold within a data eye.

9. A method of generating an adaptive slicer threshold, comprising:
determining a minimum value of a binary one by comparing a first received binary signal with a first delayed output signal;
determining a maximum value of a binary zero by comparing a second received binary signal with a second delayed output signal, wherein the second received binary signal comprises only binary values of zero and includes both positive and negative values;
combining the minimum value of the binary one and the maximum value of the binary zero to generate a combined output; and
setting a value of a slicer threshold within a data eye.

10. A method of generating an adaptive slicer threshold, comprising:
determining a minimum value of a binary one by comparing a first received binary signal with a first delayed output signal, wherein the minimum value of the binary one is further determined by combining a first leakage signal with a first output signal;

determining a maximum value of a binary zero by comparing a second received binary signal with a second delayed output signal;

combining the minimum value of the binary one and the maximum value of the binary zero to generate a combined output; and setting a value of a slicer threshold within a data eye.

11. A method of generating an adaptive slicer threshold, comprising:

determining a minimum value of a binary one by comparing a first received binary signal with a first delayed output signal;

determining a maximum value of a binary zero by comparing a second received binary signal with a second delayed output signal, wherein the maximum value of the binary zero is further determined by combining a second leakage signal with a second output signal;

combining the minimum value of the binary one and the maximum value of the binary zero to generate a combined output; and setting a value of a slicer threshold within a data eye.

12. An adaptive slicer threshold generation system, comprising:

a machine-readable storage medium; and machine-readable program code, stored on the machine-readable storage medium, the machine-readable program code having instructions to determine a first average value by combining a first received binary signal and a first delayed binary signal, determine a second average value by combining a second received binary signal and a second delayed binary signal, wherein the second received binary signal comprises only binary values of zero and includes both positive and negative values, combine the first average value and the second average value to generate a combined output, and set a value of a slicer threshold within a data eye.

13. An adaptive slicer threshold generation system, comprising:

a machine-readable storage medium; and machine-readable program code, stored on the machine-readable storage medium, the machine-readable program code having instructions to determine a first average value by combining a first received binary signal and a first delayed binary signal, wherein the machine-readable program code further includes instructions to combine a first leakage signal with the first received binary signal and the first delayed binary signal to determine the first average value, determine a second average value by combining a second received binary signal and a second delayed binary signal, combine the first average value and the second average value to generate a combined output, and set a value of a slicer threshold within a data eye.

14. An adaptive slicer threshold generation system, comprising:

a machine-readable storage medium; and machine-readable program code, stored on the machine-readable storage medium, the machine-readable program code having instructions to determine a first average value by combining a first received binary signal and a first delayed binary signal, determine a second average value by combining a second received binary signal and a second delayed binary signal, wherein the machine-readable program code further includes instructions to combine a second leakage signal with the second received binary signal and the second delayed binary signal to determine the second average value, combine the first average value and the second average value to generate a combined output, and set a value of a slicer threshold within a data eye.

15. An adaptive slicer threshold generation system, comprising:

a machine-readable storage medium; and machine-readable program code, stored on the machine-readable storage medium, the machine-readable program code having instructions to determine a minimum value of a binary one by comparing a first received binary signal with a first delayed output signal, determine a maximum value of a binary zero by comparing a second received binary signal with a second delayed output signal, wherein the second received binary signal comprises only binary values of zero and includes both positive and negative values, combine the minimum value of the binary one and the maximum value of the binary zero to generate a combined output, and set a value of a slicer threshold within a data eye.

16. An adaptive slicer threshold generation system, comprising:

a machine-readable storage medium; and machine-readable program code, stored on the machine-readable storage medium, the machine-readable program code having instructions to determine a minimum value of a binary one by comparing a first received binary signal with a first delayed output signal, wherein the machine-readable program code further includes instructions to combine a first leakage signal with a first output signal to determine the minimum value of the binary one, determine a maximum value of a binary zero by comparing a second received binary signal with a second delayed output signal, combine the minimum value of the binary one and the maximum value of the binary zero to generate a combined output, and set a value of a slicer threshold within a data eye.

17. An adaptive slicer threshold generation system, comprising:

a machine-readable storage medium; and machine-readable program code, stored on the machine-readable storage medium, the machine-readable program code having instructions to determine a minimum value of a binary one by comparing a first received binary signal with a first delayed output signal, determine a maximum value of a binary zero by comparing a second received binary signal with a second delayed output signal, wherein the machine-readable program code further includes instructions to combine a second leakage signal with a second output signal to determine the maximum value of the binary zero, combine the minimum value of the binary one and the maximum value of the binary zero to generate a combined output, and set a value of a slicer threshold within a data eye.

* * * * *